G. O. LEOPOLD.
GEARING.
APPLICATION FILED SEPT. 14, 1910.
1,023,023.
Patented Apr. 9, 1912.
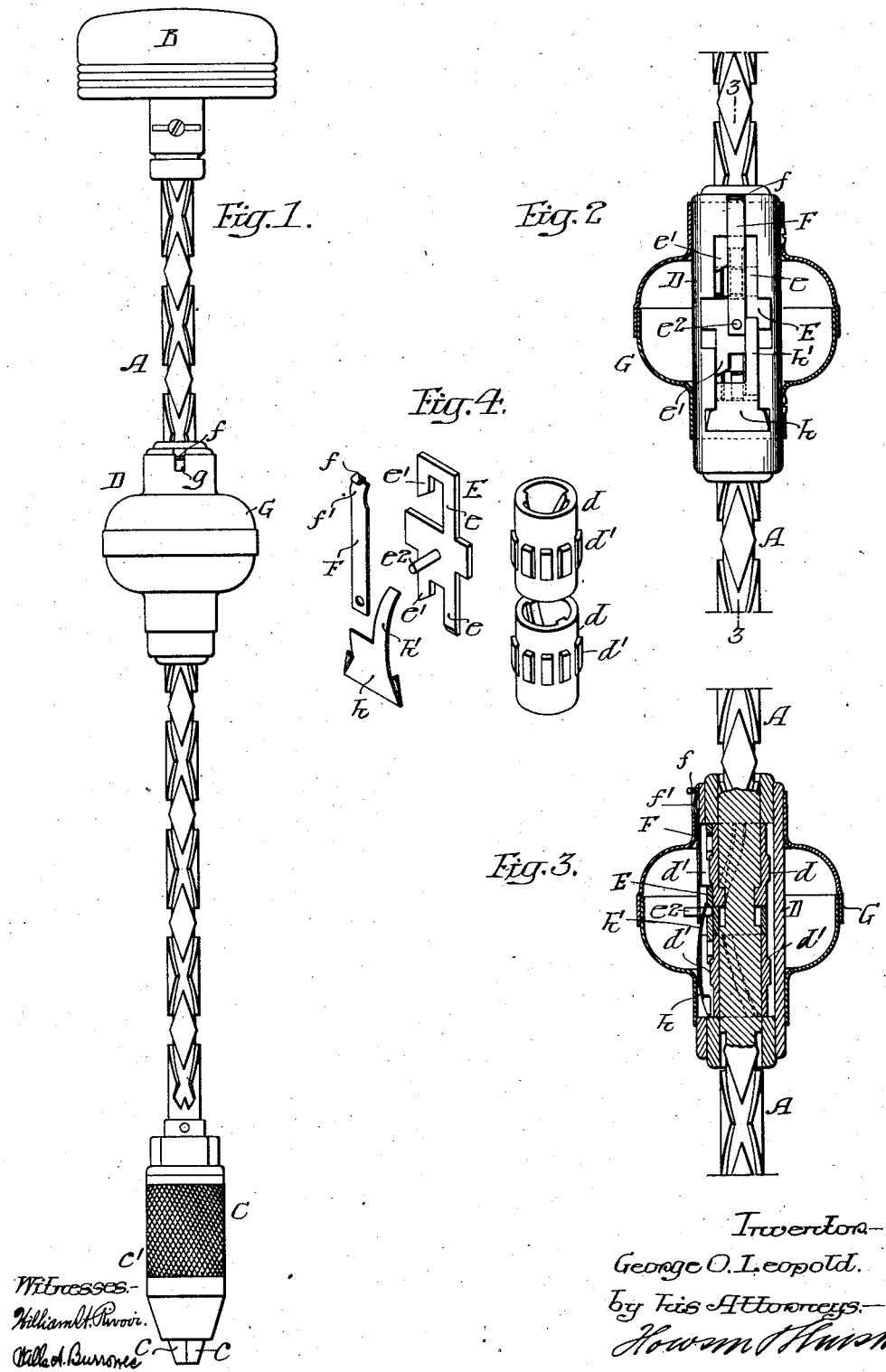

UNITED STATES PATENT OFFICE.

GEORGE O. LEOPOLD, OF PHILADELPHIA, PENNSYLVANIA, ASSIGNOR TO NORTH BRO'S. M'F'G CO., OF PHILADELPHIA, PENNSYLVANIA, A CORPORATION OF PENNSYLVANIA.

GEARING.

1,023,023.   Specification of Letters Patent.   Patented Apr. 9, 1912.

Application filed September 14, 1910. Serial No. 581,928.

*To all whom it may concern:*

Be it known that I, GEORGE O. LEOPOLD, a citizen of the United States, residing in Philadelphia, Pennsylvania, have invented certain Improvements in Gearing, of which the following is a specification.

The object of my invention is to so construct the mechanism of a reciprocating drill that the sliding grip piece can be locked at any point desired so that the chuck can be opened or closed to release the drill bit or firmly secure it in position. Heretofore it has been difficult to properly hold the spindle of a drill of this type while securing the drill bit.

In the accompanying drawings:—Figure 1, is a side view of a reciprocating drill illustrating my invention; Fig. 2, is a sectional view of a portion of the mechanism illustrated in Fig. 1; Fig. 3, is a vertical sectional view on the line 3—3, Fig. 2; and Fig. 4, is a detached perspective view of parts of the drill.

A is the spindle of the drill having a right and left hand spiral groove therein.

B is the head loosely mounted on the spindle; the spindle being so arranged that it will freely rotate in the head. On the opposite end of the spindle is a chuck C having jaws $c$—$c$ which are opened and closed by turning the sleeve $c'$. Any suitable chuck may be used without departing from the essential features of the invention.

D is the sliding carrier in which are mounted the nuts $d$—$d$ having ribs which travel in the spiral grooves of the spindle. On these two nuts are ratchet teeth $d'$. Adapted to slide over the nuts is a pawl piece E having on one side long pawls $e$ and on the opposite side short pawls $e'$. This pawl piece has a pin $e^2$ to which is connected a slide F having a projecting portion $f$ which extends through a slot $g$ in the casing G of the carrier D. A spring $h$ rests on the carrier and has an extension $h'$ which bears upon the pawl piece. The slide is bent at $f'$ so that it will bind and thus provide sufficient friction to hold the slide in either of its two positions.

When the slide F is moved outward, as indicated in Figs. 1 and 3 of the drawings, only the long pawls $e$—$e$ of the slide engage the ratchet wheels but when it is pushed in the short pawls $e'$ engage the ratchet wheel, as well as the long pawl $e$—$e$, thus firmly securing the nuts, preventing them from moving in either direction, thus locking the carrier D to the spindle so that on grasping the carrier when the sleeve $c'$ is turned, the spindle is held rigidly in position.

By the above construction the sliding grip piece can be locked to the spindle at any point throughout the length of the spindle so that on firmly gripping the sliding grip piece with one hand, the chuck can be readily turned by the other hand when it is desired to secure a bit to the chuck or to release one from it.

I claim:—

1. The combination of a spindle having right and left hand grooves therein, a reciprocating carrier, two nuts mounted in the carrier having portions entering the spiral grooves and having teeth thereon and a pawl piece having short and long pawls thereon, means for shifting the pawl piece so that when it is in one position the long pawls only engage the ratchet nuts, allowing the carrier to be reciprocated, and when moved in the other position both sets of pawls will engage the ratchet nuts and lock the carrier to the spindle.

2. The combination of a spindle having right and left spiral grooves therein, a carrier mounted thereon, two nuts mounted in the carrier and having ratchet teeth, a pawl piece having short and long teeth, a pin projecting from the pawl piece, a slide secured to the pin, a spring tending to hold the pawl piece to the nuts, and a slotted casing inclosing the mechanism, said slide projecting through the slot in the casing.

In testimony whereof, I have signed my name to this specification, in the presence of two subscribing witnesses.

GEORGE O. LEOPOLD.

Witnesses:
  WM. E. SHUPE,
  WM. A. BARR.

Copies of this patent may be obtained for five cents each, by addressing the "Commissioner of Patents, Washington, D. C."